US012745213B2

(12) United States Patent
Chen et al.

(10) Patent No.: US 12,745,213 B2
(45) Date of Patent: Sep. 22, 2026

(54) COMMUNICATION DEVICE HAVING CROSS-PLATFORM COMMUNICATION FUNCTION, COMMUNICATION SYSTEM HAVING THE SAME AND COMMUNICATION METHOD THEREOF

(71) Applicant: Industrial Technology Research Institute, Hsinchu (TW)

(72) Inventors: Yu-Chang Chen, New Taipei City (TW); Yen-Nien Lu, Tainan City (TW); Shu-Yu Lin, Taoyuan City (TW); Chun-Hsien Tien, Nantou County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 349 days.

(21) Appl. No.: 18/537,883

(22) Filed: Dec. 13, 2023

(65) Prior Publication Data

US 2024/0205876 A1 Jun. 20, 2024

(30) Foreign Application Priority Data

Dec. 15, 2022 (TW) ................................. 111148245

(51) Int. Cl.

*H04W 64/00* (2009.01)
*H04W 76/50* (2018.01)
*H04W 92/18* (2009.01)

(52) U.S. Cl.

CPC ......... *H04W 64/006* (2013.01); *H04W 76/50* (2018.02); *H04W 92/18* (2013.01)

(58) Field of Classification Search

CPC .... H04W 64/006; H04W 76/50; H04W 92/18
See application file for complete search history.

(56) References Cited

U.S. PATENT DOCUMENTS 10,042,034 B2 8/2018 Kaio
2015/0365808 A1 12/2015 Tseng
(Continued)

FOREIGN PATENT DOCUMENTS

CN 105890605 A 8/2016
CN 106043629 A 10/2016
(Continued)

OTHER PUBLICATIONS

TW OA issued on Nov. 23, 2023.

*Primary Examiner* — Timothy X Pham
(74) *Attorney, Agent, or Firm* — WPAT, PC

(57) ABSTRACT

A communication device having cross-platform communication function includes a signal transmitting module, a positioning module and a processing module. The positioning module receives the coordinate of the current location thereof. The processing module is corresponding to a mobile device, and connected to the signal transmitting module and the positioning module. The processing module receives the coordinate to generate the location information of the communication device, and transmits the location information to the mobile device and a nearby mobile device close to the mobile device via the signal transmitting module, such that the location information is transmitted to a cloud processing system via the mobile device and/or the nearby mobile device.

17 Claims, 5 Drawing Sheets

(56) References Cited

U.S. PATENT DOCUMENTS

| | | | | |
|---|---|---|---|---|
| 2020/0396197 | A1* | 12/2020 | Ko | H04M 19/04 |
| 2021/0084577 | A1 | 3/2021 | Wakabayashi et al. | |
| 2024/0031975 | A1* | 1/2024 | Baek | H04W 4/40 |
| 2024/0179673 | A1* | 5/2024 | Kim | H04W 4/029 |
| 2025/0008605 | A1* | 1/2025 | Zhou | H04W 48/16 |
| 2025/0227651 | A1* | 7/2025 | Kumar | H04W 64/00 |

FOREIGN PATENT DOCUMENTS

| | | | |
|---|---|---|---|
| CN | 106225799 | A | 12/2016 |
| CN | 108700421 | A | 10/2018 |
| TW | 201201148 | | 1/2012 |
| TW | I376652 | B | 11/2012 |
| TW | 201706569 | | 2/2017 |
| TW | M574737 | U | 2/2019 |
| TW | 202037205 | | 10/2020 |
| WO | WO2021096514 | | 5/2021 |

* cited by examiner

COMMUNICATION DEVICE HAVING CROSS-PLATFORM COMMUNICATION FUNCTION, COMMUNICATION SYSTEM HAVING THE SAME AND COMMUNICATION METHOD THEREOF

CROSS REFERENCE TO RELATED APPLICATION

All related applications are incorporated by reference. The present application is based on, and claims priority from, Taiwan Application Serial Number 111148245, filed on Dec. 15, 2022, the disclosure of which is hereby incorporated by reference herein in its entirety.

TECHNICAL FIELD

The technical field relates to a communication device, in particular to a communication device having cross-platform communication function. The technical field further relates to a communication system having the above communication device and the communication thereof.

BACKGROUND

With the improvement in quality of life, people are increasingly focusing on leisure activities. Mountain climbing has gradually become one of the most popular activities. However, mountain climbing has its peculiarities and certain risks. Climbers must make sure that their physical health before engaging in climbing high mountains and hiking activities. In addition, these climbers must have adequate prior preparation.

Due to a mountainous region are large, a mountain guide often can only confirm the number of climbers at a predetermined camping point or resting point. Moreover, communication in the mountainous region is difficult, so it is very difficult to promptly ascertain the locations of missing climbers. Additionally, when a climber goes missing, search and rescue efforts rely on basic data and maps, which requires extra time to calculate the possible locations of the missing climbers. Consequently, search and rescue operations are time-consuming and require significant human resources.

SUMMARY

One embodiment of the disclosure provides a communication device having cross-platform communication function, which includes a signal transmitting module, a positioning module and a processing module. The positioning module receives the coordinate of the current location thereof. The processing module is corresponding to a mobile device, and connected to the signal transmitting module and the positioning module. The processing module receives the coordinate to generate the location information of the communication device, and transmits the location information to the mobile device and a nearby mobile device close to the mobile device via the signal transmitting module, such that the location information is transmitted to a cloud processing system via the mobile device and/or the nearby mobile device.

Another embodiment of the disclosure provides a communication system having cross-platform communication function, which includes a plurality of communication devices, a plurality of mobile devices and a cloud processing system. The mobile devices are corresponding to the communication devices respectively. The cloud processing system communicates with the mobile devices. Any one of the communication devices obtains the coordinate of the current location thereof to generate the location information of the communication device, and transmit the location information to the mobile device corresponding thereto and a nearby mobile device close to the mobile device, such that the location information is transmitted to the cloud processing system via the mobile device and/or the nearby mobile device.

Still another embodiment of the disclosure provides a cross-platform communication method, which includes the following steps: obtaining the coordinate of the current location of a communication device; generating the location information of the communication device according to the coordinate; transmitting the location information of the communication device to a mobile device corresponding to the communication device; and transmitting the location information of the communication to a nearby mobile device close to the mobile device so as to transmit the location information of the communication device to a cloud processing system via the mobile device and/or the nearby mobile device.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
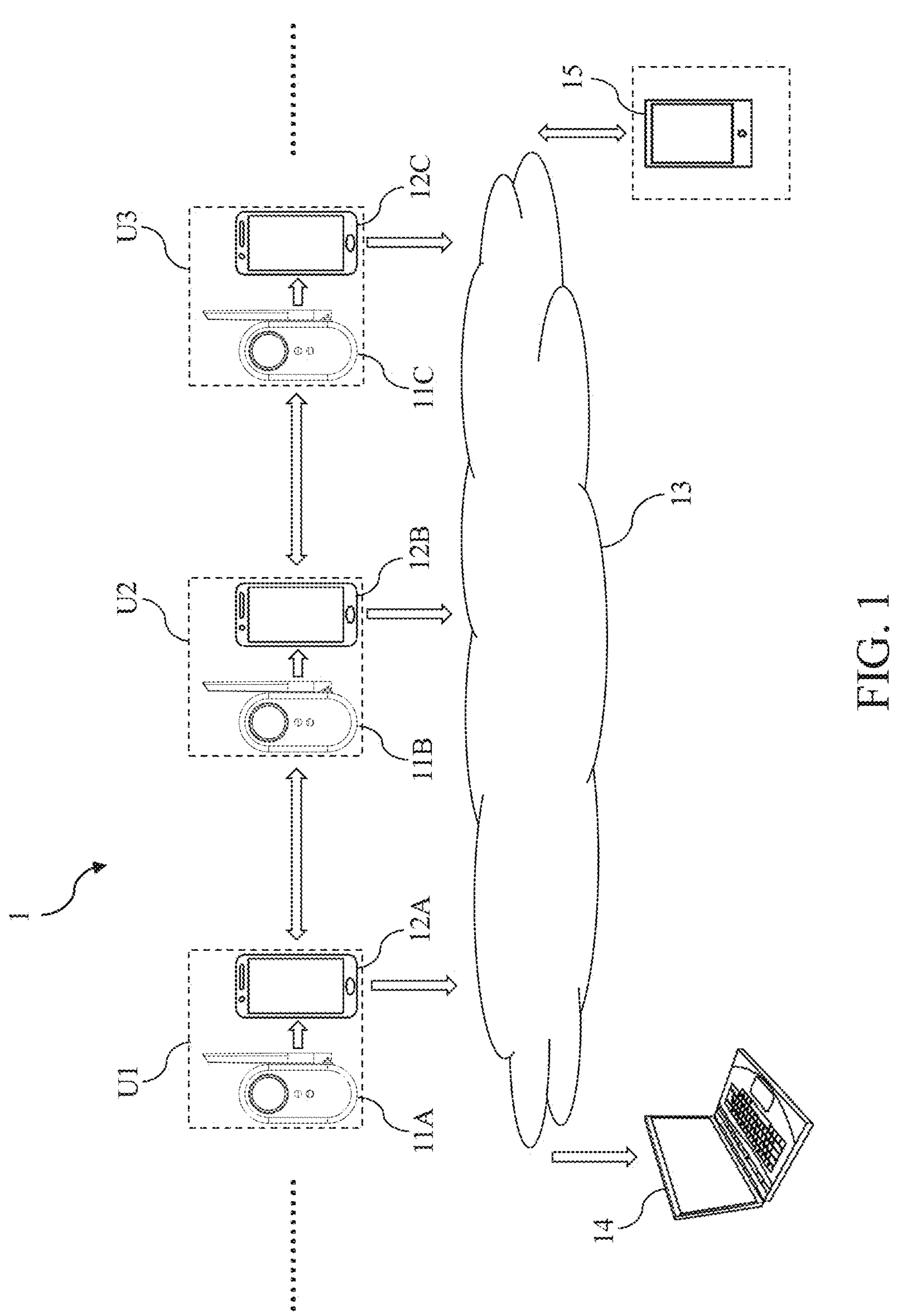
FIG. 1 is a schematic view of a communication system having cross-platform communication function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of a communication system having cross-platform communication function in accordance with one embodiment of the present invention. As shown in FIG. 1, the communication system 1 can be applied to mountain climbing activities and includes a plurality of communication devices 11A, 111B, 11C, a plurality of mobile devices 12A, 12B, 12C, a cloud processing system 13, an emergency coordinator electronic device 14, and a guide mobile device 15 (the mobile device held by the mountain guide).

The mountain climbing team includes several users U1, U2, U3, and a mountain guide U4. The mobile devices 12A, 12B, 12C correspond to the communication devices 11A, 11B, 11C respectively. In one embodiment, the mobile devices 12A, 12B, 12C can be, but not limited to, smartphones, smartwatches, tablet computers, or other similar devices. Specifically, the communication device 11A and mobile device 12A form a communication group held by user the U1 (climber). The communication device 11B and mobile device 12B form a communication group held by user U2. The communication device 11C and mobile device 12C form a communication group held by user U3. The number of the aforementioned mobile devices, communication devices, and users are for illustrative purposes, which can be adjusted according to actual requirements.

The cloud processing system 13 can wirelessly communicate with the mobile devices 12A, 12B, 12C. In one embodiment, the cloud processing system 13 can be, but not limited to, a server, workstation, or other currently available computer devices with computational capabilities.

The emergency coordinator electronic device 14 can wirelessly communicate with the cloud processing system 13 to receive signals transmitted from the mobile devices 12A, 12B, 12C. In one embodiment, the emergency coordinator electronic device 14 can be, but not limited to, a smartphone, tablet computer, laptop computer, personal computer, or other currently available computer devices with computational capabilities. The emergency coordinator electronic device 14 can be placed at the mountain climbing base or other proper locations and managed by one or more coordinators to periodically or non-periodically communicate with the users.

The guide mobile device 15 is held by the mountain guide. The guide mobile device 15 can wirelessly communicate with the cloud processing system 13 to receive signals transmitted from the mobile devices 12A, 12B, 12C or send signals to the cloud processing system 13. In one embodiment, the guide mobile device 15 can be, but not limited to, a smartphone, smartwatch, tablet computer, or other similar devices. Additionally, the mountain guide can also carry a communication device.

Arbitrarily certain communication device obtains the coordinate of the current location thereof to generate the location information of the communication device. Simultaneously, the communication device transmits the location information to the corresponding mobile device and another mobile device close to this mobile device, such that the location information of the communication device can be transmitted to the cloud processing system 13 through the mobile device and/or another mobile device. In this embodiment, the above coordinate may be a global positioning system (GPS) coordinate. The location information may include one or more of longitude coordinate, latitude coordinate, altitude coordinate, moving speed, moving trajectory and moving distance.

For instance, the communication device 11B can obtain the coordinate of the current location thereof to generate the location information for communication device 11B. Subsequently, the communication device 11B can transmit the location information to the corresponding mobile device 12B and another mobile device 12C close to the mobile device 12B (or further transmit which to other users' mobile devices). The mobile devices 12B and 12C can then transmit the location information of the communication device 11B to the cloud processing system 13. The communication device 11A and communication device 11C can perform the above steps.

Furthermore, the communication device 11B can receive the location information of the corresponding communication device 11A from the nearby mobile device 12A and transmit the location information of the communication device 11A to the cloud processing system 13 through mobile device 12B. Consequently, each communication device not only transmits the location information thereof to the cloud processing system 13 via the corresponding mobile device, but also through another nearby communication device. Additionally, the nearby mobile device receives the location information of the communication device corresponding thereto and transmits which to the cloud processing system 13. Therefore, the cloud processing system 13 can acquire the location information of all communication devices 11A, 11B, 11C to integrate this information with an offline map so as to obtain the locations of the communication device 11A, 11B, 11C. Afterward, the cloud processing system 13 can display the locations of the communication device 11A, 11B, 11C through a visual interface for quick identification. The cloud processing system 13 can then provide this information to the emergency coordinator electronic device 14 and guide mobile device 15 in order to take necessary actions promptly or enhance the efficiency of search and rescue activities when necessary. Moreover, the communication system 1 can use the island-hopping network architecture based on IoT technology to locate and search any one of the communication devices 11A, 11B, 11C via a relay communication mode. Accordingly, the communication system 1 can make sure that the location information of all communication devices 11A, 11B, 11C can be effectively received with a view to tracking each of the communication devices 11A, 11B, 11C and prevent any one of the communication devices 11A, 11B, 11C from losing contact.

Additionally, the cloud processing system 13 can perform calculations based on the last several pieces of data of the communication device losing contact, corresponding data from nearby communication devices, moving trajectory, moving speed, hardware errors, and other information to calculate the estimated location of the communication device losing contact.

For example, when the user U2 loses contact, the cloud processing system 13 can calculate the location of the communication device 11B (the user U2) based on the last several pieces of data of the communication device 11B carried by the user U2 and corresponding data of the nearby communication devices (corresponding to the time points of the aforementioned last several pieces of data), moving trajectory of the communication device 11B, moving speed of the communication device 11B, and hardware errors of the communication device 11B, as shown in Equation (1) given below:

$$D = \begin{bmatrix} X_{11A} \pm X_{11B} \\ Y_{11A} \pm Y_{11B} \\ Z_{11A} \pm Z_{11B} \end{bmatrix} + i + S \quad (1)$$

In Equation (1), D stands for the distance between the communication device 11A and the communication device 11B; $X_{11A}$, $Y_{11A}$, $Z_{11A}$ represent the latitude, longitude, and altitude of the communication device 11A (the GPS coordinate) respectively; $X_{11B}$, $Y_{11B}$, $Z_{11B}$ stand for the latitude, longitude, and altitude of the communication device 11B (the GPS coordinate) respectively; i stands for the hardware error of the communication device 11A and communication device 11B (which can be provided by the manufacturer); S stands for the average moving speed of the communication device 11B (the user U2) on that day.

Of course, Equation (1) is provided as an example rather than limitation. The cloud processing system 13 can use other methods based on the above information to calculate the location of the communication device 11B (the user U2).

The data transmission and communication of the communication system 1 can be implemented based on low power wide area network (LPWAN) technology, unlicensed spectrum technology, location based service (LBS), or other related technologies.

Via the above mechanism, the cloud processing system 13 can calculate the estimated location of the communication device losing contact by a specific computational method based on the last several pieces of data of the communication device losing contact, corresponding data from nearby communication devices, moving trajectory, moving speed, hardware errors, and other information when any one of the communication devices loses contact. Simultaneously, the cloud processing system 13 can transmit this information to the emergency coordinator electronic device 14 and guide mobile device 15, which can enable timely search and rescue activities, and the efficiency of such activities can be further improved.

The embodiment just exemplifies the disclosure and is not intended to limit the scope of the disclosure. Any equivalent modification and variation according to the spirit of the disclosure is to be also included within the scope of the following claims and their equivalents.

Figure 2:
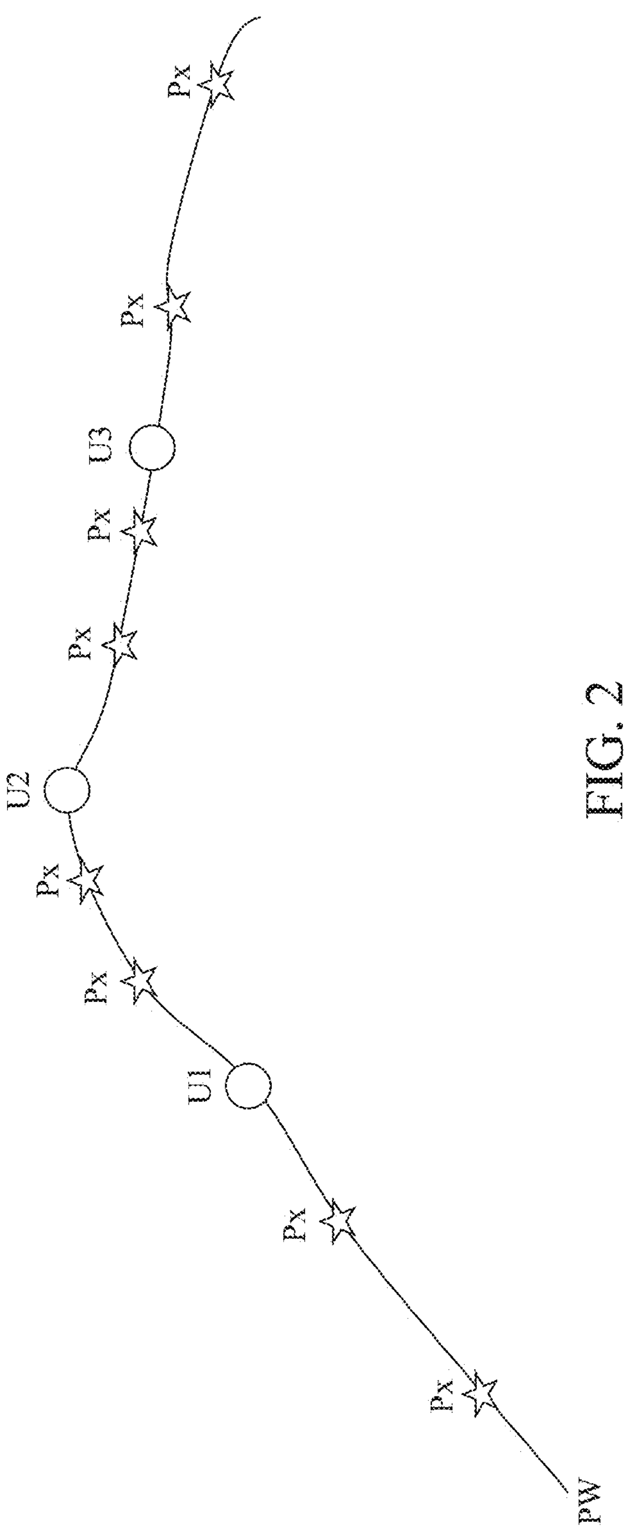
FIG. 2 is a first schematic view of an illustrative usage scenario of the communication system having cross-platform communication function in accordance with one embodiment of the present invention.
Figure 3:
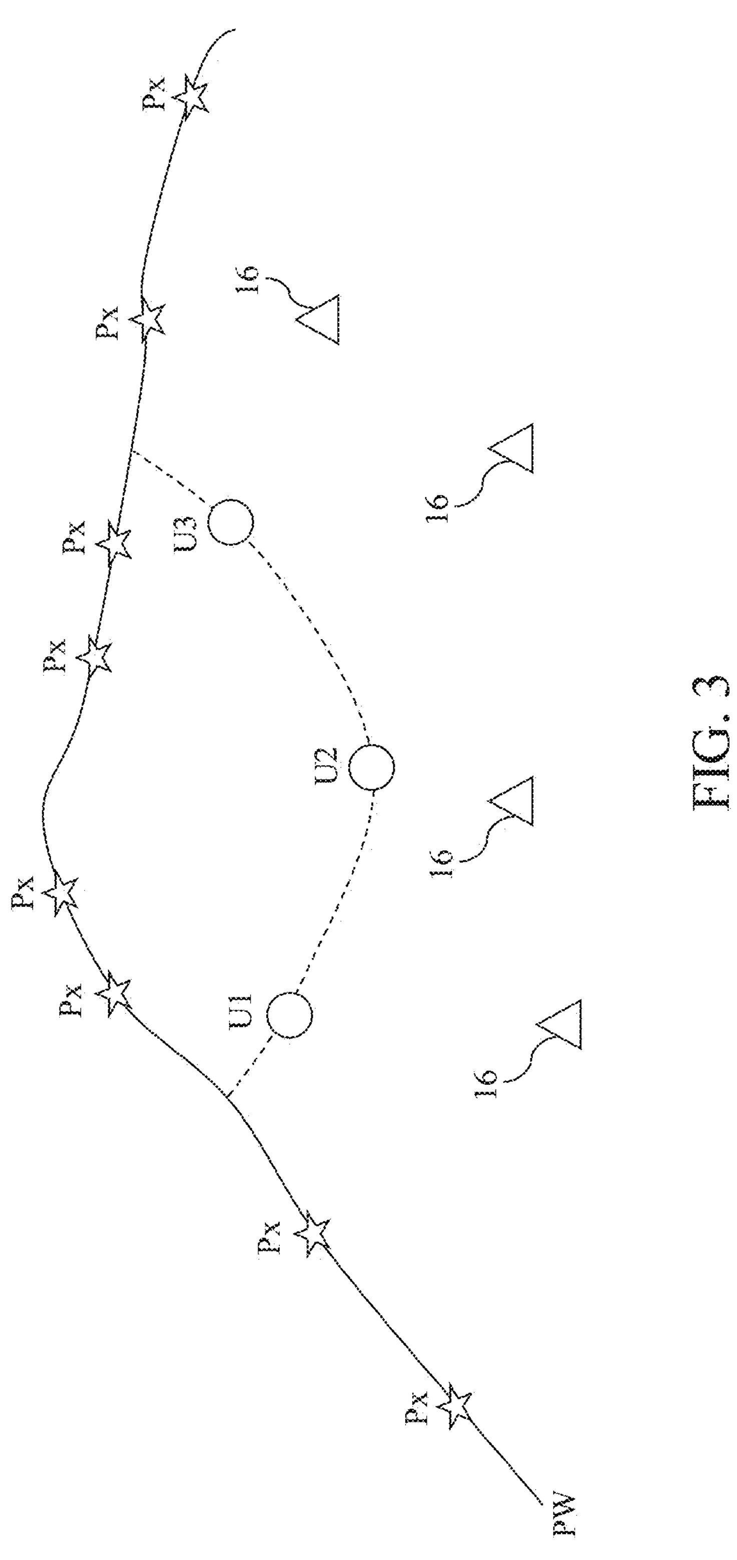
FIG. 3 is a second schematic view of the illustrative usage scenario of the communication system having cross-platform communication function in accordance with one embodiment of the present invention.

Please refer to FIG. 2 and FIG. 3, which are a first schematic view and a second schematic view of an illustrative usage scenario of the communication system having cross-platform communication function in accordance with one embodiment of the present invention respectively. As shown in FIG. 2, the cloud processing system 13 can obtain the location information of all communication devices 11A, 11B, 11C, including the moving trajectories of these communication device 11A, 11B, 11C. In addition, the cloud processing system 13 can integrate this information with the offline map (a digital terrain model) to generate a visual interface. Through this interface, the positions and moving trajectories of all users U1, U2, U3 can be obtained in order to determine whether any one of the users U1, U2, U3 deviates from the main route PW (where the points Px stand for the main route tracking points).

As shown in FIG. 3, when the users U1, U2, U3 deviate from the main route PW, their positions and moving trajectories can still be effectively determined through the visual interface. Therefore, when any one of the user U1, U2, U3 loses contact, his/her corresponding moving trajectory can be identified through the visual interface so as to ensure that timely actions can be taken.

As set forth above, when the user U2 (the communication device 11B) experiences communication interruption due to being in a dead zone, the communication system 1 can use the island-hopping network architecture based on IoT technology to locate and search for the communication device 11B via the relay communication mode. In this way, the communication system 1 can effectively track the communication device 11B.

The communication system 1 can also include a plurality of warning devices 16 (only four warning devices 16 are shown in FIG. 3, but the quantity of the warning devices 16 can be changed according to actual requirements). When any one of the communication device 11A, 11B, 11C approaches any one of the warning devices 16, the warning device 16 generates a warning signal in order to provide the warning function. For example, when the user U2 carrying the communication device 11B approaches the warning device 16, the warning device 16 generates a warning signal and transmits which to the communication device 11B, such that the communication device 11B generates a warning sound or light to prevent the user U2 from approaching the dangerous area.

As previously stated, the communication system 1 of this embodiment can provide the cross-platform communication function (the communication devices, mobile devices, cloud processing system, etc.) via the island-hopping network architecture based on IoT technology. Consequently, the communication system 1 can locate and search for any one of the communication devices that experiences communication interruption due to being in a dead zone by using the relay communication mode. Therefore, the communication system 1 can receive the location information of this communication device in order to effectively track all communication devices and preventing any one of the communication devices from losing contact.

Furthermore, the cloud processing system 13 of the communication system 1 can receive the location information of these communication devices corresponding to multiple mobile devices and transmit this information to the emergency coordinator electronic device 14 and/or the guide mobile device 15. Simultaneously, the cloud processing system 13 can obtain the locations of these communication device through the positioning system, remote node communication mode, and offline map. The above information can be displayed in a visual interface for rapid identification of the locations of all communication devices. Thus, the emergency coordinators and mountain guides at a distance can effectively monitor and track all communication devices so as to make sure all that climbers are safe, enhance the efficiency of rescue operations and reduce the waste of manpower resources.

The embodiment just exemplifies the disclosure and is not intended to limit the scope of the disclosure. Any equivalent modification and variation according to the spirit of the disclosure is to be also included within the scope of the following claims and their equivalents.

It is worthy to point out that there is no an effectively tracking system for now. Therefore, when a climber goes missing, search and rescue efforts rely on basic data and maps, which requires extra time to estimate the possible locations of the missing climbers. Consequently, search and rescue operations are time-consuming and require significant human resources. By contrast, according to the embodiments of the disclosure, the communication system having cross-platform communication function can realize an island-hopping network architecture based on Internet of Things (IoT) technology. In situations where any one of the communication devices experiences interruptions due to dead zones, the communication system can locate and search for the affected communication device via the relay communication mode. The above communication mode can make sure that the communication system can receive the location information of the communication device to effectively track all communication devices so as to preventing these communication devices from losing contact.

Additionally, according to the embodiments of the disclosure, after one of the communication devices loses contact, the communication system employs a specialized computational method to calculate the estimated location of this communication device according to the last pieces of data of this communication device, data from another communication device close to this communication device, moving trajectory, moving speed, hardware errors, and other relevant information. In this way, the communication system can significantly enhances the efficiency of search and rescue operations while conserving substantial manpower resources.

Further, according to the embodiments of the disclosure, the cloud processing system of the communication system can receive the location information of multiple communication devices through the mobile devices corresponding thereto, and transmits the above information to an emergency coordinator electronic device and/or the mobile device of a mountain guide. Meanwhile, the cloud processing system can obtain the locations of all communication devices via the positioning system, remote node communication mode, and offline map. In addition, the communication system can display the locations of all communication devices on a visual interface for quick identification. Accordingly, the emergency coordinators and mountain guides at a distance can effectively monitor and track all communication devices in order to ensure the safety of all climbers.

Moreover, according to the embodiments of the disclosure, the communication system significantly improves the efficiency of search and rescue operations, thereby reducing the time required for these operations. As a result, the communication system can enhances the success rate of search and rescue operations with a view to meeting actual requirements.

Furthermore, according to the embodiments of the disclosure, the communication system can achieve the desired technical effects without significantly increasing the cost thereof, so the communication system can be more comprehensive in use. Consequently, the penetration rate of the communication system can be significantly increased so as to extending the application range thereof. As described above, the communication system according to the embodiments can definitely achieve great technical effects.

Figure 4:
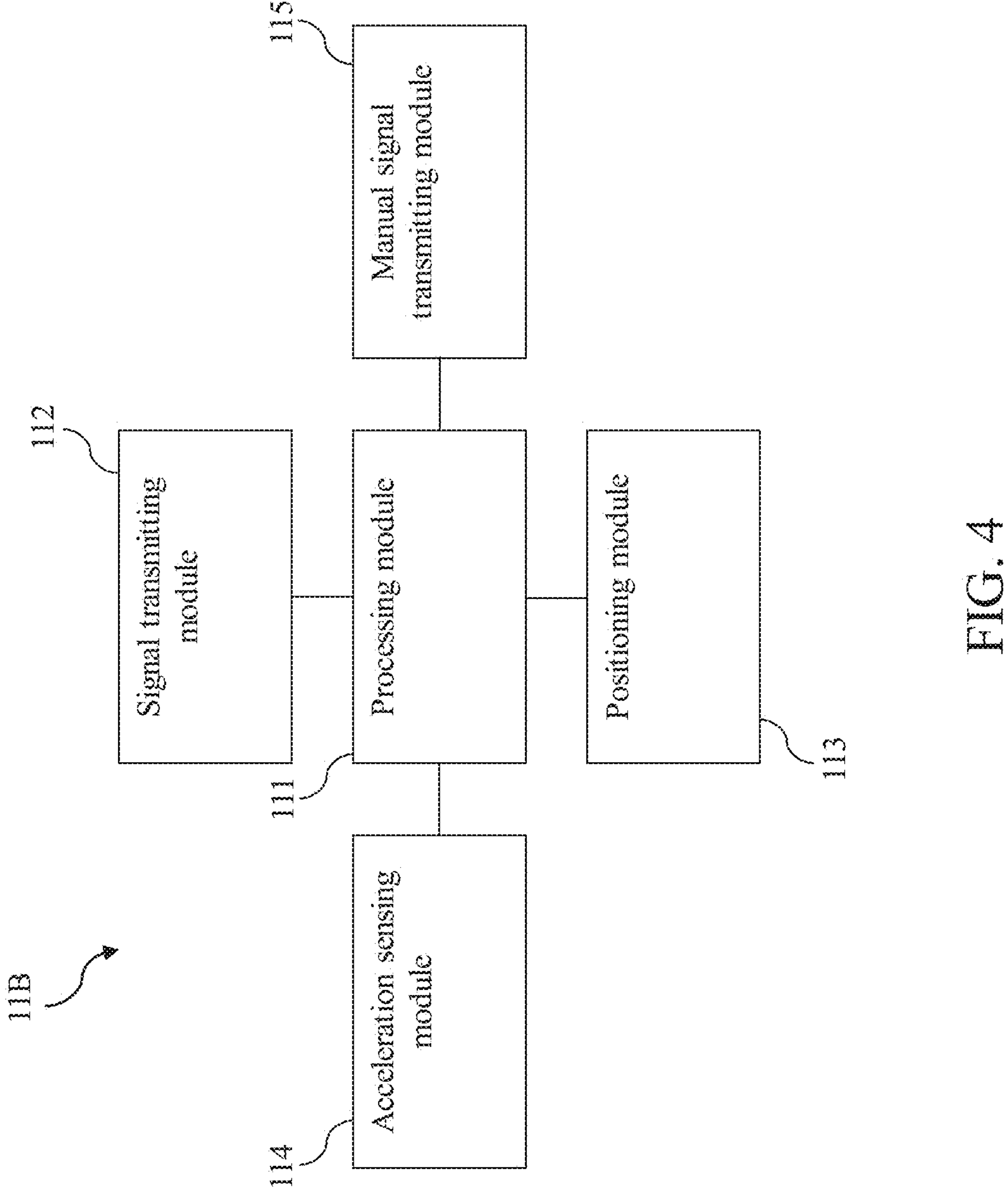
FIG. 4 is a block diagram of a communication device having cross-platform communication function in accordance with one embodiment of the present invention.

Please refer to FIG. 4, which is a block diagram of a communication device having cross-platform communication function in accordance with one embodiment of the present invention. Please also refer to FIG. 1. As shown in FIG. 4, the communication device 11B includes a processing module 111, a signal transmitting module 112, a positioning module 113, an acceleration sensing module 114, and a manual signal transmitting module 115. The processing module 111 is connected to the signal transmitting module 112, the positioning module 113, the acceleration sensing module 114, and the manual signal transmitting module 115.

The positioning module 113 cam obtain the coordinate of the current location thereof. In this embodiment, the positioning module 113 is a global positioning system (GPS) module. In another embodiment, the positioning module 113 can also be a module based on other currently available satellite positioning systems (such as the Beidou navigation satellite system, Galileo satellite navigation system, etc.).

The processing module 111 is corresponding to the mobile device 112B. The processing module 111 receives the coordinate to generate the location information of communication device 11B. Simultaneously, through the signal transmitting module 112, the location information of the communication device 11B can be transmitted to mobile device 12B and the nearby mobile device 12C, such that the position information of the communication device 11B can be transmitted to the cloud processing system 13 via the mobile device 12B and/or the nearby mobile device 12C. The processing module 111 can also receive the position information of the communication device 11A corresponding to another mobile device 12A close to the mobile device 12B and transmit which to the cloud processing system 13. In one embodiment, the processing module 111 can be a central processing unit (CPU), microcontroller unit (MCU), application-specific integrated circuit (ASIC), or other similar components. In one embodiment, the signal transmitting module 112 can be an antenna or other similar components.

The acceleration sensing module 114 can measure acceleration. In one embodiment, the acceleration sensing module 114 can be an accelerometer or other devices having the function similar to the accelerometer.

The manual signal transmitting module 115 can be used to control the processing module 111 to transmit the location information of the communication device 11B to the mobile device 12B and the nearby mobile device 12C. The user can manually operate the manual signal transmitting module 115 to control the processing module 111 to transmit the location information of communication device 11B. In one embodiment, the manual signal transmitting module 115 can be a button, a knob, or other similar components.

The circuit structures and functions of the communication devices 11A and 11C are similar to those of the communication device 11B, so will not be further described herein.

The embodiment just exemplifies the disclosure and is not intended to limit the scope of the disclosure. Any equivalent modification and variation according to the spirit of the disclosure is to be also included within the scope of the following claims and their equivalents.

Figure 5:
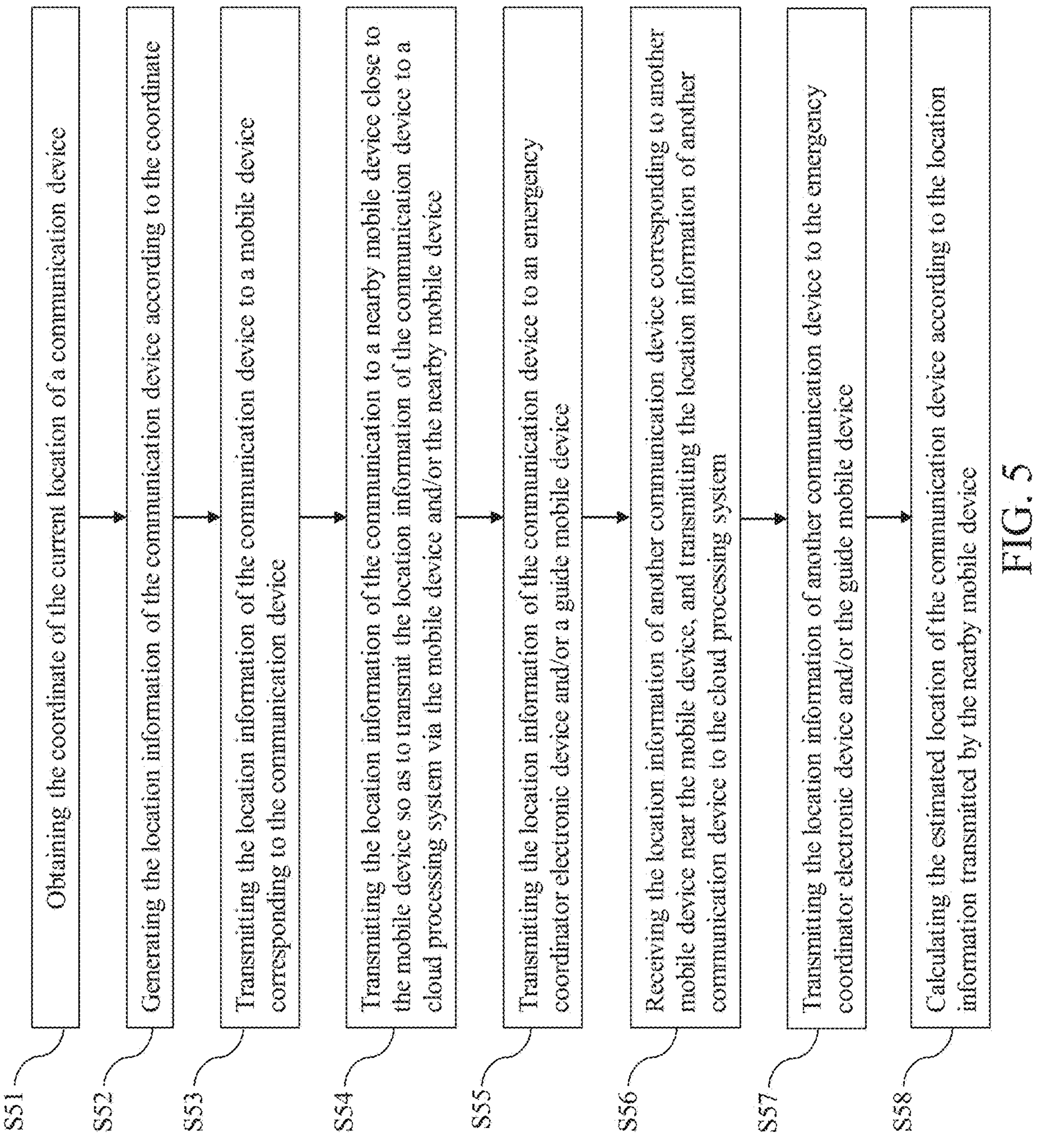
FIG. 5 is a flow chart of a cross-platform communication method in accordance with one embodiment of the present invention.

FIG. 5 is a flow chart of a cross-platform communication method in accordance with one embodiment of the present invention. As shown in FIG. 5, the cross-platform communication function includes the following steps:

Step S51: obtaining the coordinate of the current location of a communication device.

Step S52: generating the location information of the communication device according to the coordinate.

Step S53: transmitting the location information of the communication device to a mobile device corresponding to the communication device.

Step S54: transmitting the location information of the communication to a nearby mobile device close to the mobile device so as to transmit the location information of the communication device to a cloud processing system via the mobile device and/or the nearby mobile device.

Step S55: transmitting the location information of the communication device to an emergency coordinator electronic device and/or a guide mobile device.

Step S56: receiving the location information of another communication device corresponding to another mobile device near the mobile device, and transmitting the location information of another communication device to the cloud processing system.

Step S57: transmitting the location information of another communication device to the emergency coordinator electronic device and/or the guide mobile device.

Step S58: calculating the estimated location of the communication device according to the location information transmitted by the nearby mobile device.

The embodiment just exemplifies the disclosure and is not intended to limit the scope of the disclosure. Any equivalent modification and variation according to the spirit of the disclosure is to be also included within the scope of the following claims and their equivalents.

It should also be noted that at least some of the operations for the methods described herein may be implemented using software instructions stored on a computer useable storage medium for execution by a computer (or a processor). As an example, an embodiment of a computer program product includes a computer useable storage medium to store a computer readable program.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to the embodiments of the disclosure, the communication system having cross-platform communication function can realize an island-hopping network architecture based on Internet of Things (IoT) technology. In situations where any one of the communication devices experiences interruptions due to dead zones, the communication system can locate and search for the affected communication device via the relay communication mode. The above communication mode can make sure that the communication system can receive the location information of the communication device to effectively track all communication devices so as to preventing these communication devices from losing contact.

Additionally, according to the embodiments of the disclosure, after one of the communication devices loses contact, the communication system employs a specialized computational method to calculate the estimated location of this communication device according to the last pieces of data of this communication device, data from another communication device close to this communication device, moving trajectory, moving speed, hardware errors, and other relevant information. In this way, the communication system can significantly enhances the efficiency of search and rescue operations while conserving substantial manpower resources.

Further, according to the embodiments of the disclosure, the cloud processing system of the communication system can receive the location information of multiple communication devices through the mobile devices corresponding thereto, and transmits the above information to an emergency coordinator electronic device and/or the mobile device of a mountain guide. Meanwhile, the cloud processing system can obtain the locations of all communication devices via the positioning system, remote node communication mode, and offline map. In addition, the communication system can display the locations of all communication devices on a visual interface for quick identification. Accordingly, the emergency coordinators and mountain guides at a distance can effectively monitor and track all communication devices in order to ensure the safety of all climbers.

Moreover, according to the embodiments of the disclosure, the communication system significantly improves the efficiency of search and rescue operations, thereby reducing the time required for these operations. As a result, the communication system can enhances the success rate of search and rescue operations with a view to meeting actual requirements.

Furthermore, according to the embodiments of the disclosure, the communication system can achieve the desired technical effects without significantly increasing the cost thereof, so the communication system can be more comprehensive in use. Consequently, the penetration rate of the communication system can be significantly increased so as to extending the application range thereof.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication system having cross-platform communication function, comprising:

a plurality of communication devices;

a plurality of mobile devices corresponding to the communication devices respectively; and a cloud processing system configured to communicate with the mobile devices;

wherein any one of the communication devices is configured to obtain a coordinate of a current location thereof to generate a location information of the communication device, and transmit the location information to the mobile device corresponding thereto and a nearby mobile device close to the mobile device, whereby the location information is transmitted to the cloud processing system via the mobile device and/or the nearby mobile device, wherein when any one of the communication devices loses contact, the cloud processing system is configured to calculate a location of the communication device losing contact according to a moving trajectory, a moving speed, hardware errors and last several pieces of the location information of the communication device losing contact, and a corresponding location information of the communication device adjacent to the communication device losing contact.

2. The communication system having cross-platform communication function of claim 1, wherein the communication device is configured to periodically transmit the location information thereof to the mobile device corresponding thereto or the nearby mobile device.

3. The communication system having cross-platform communication function of claim 1, wherein the communication device is configured to receive a location information of another communication device corresponding to another mobile device close to the mobile device, and transmit the location information of another communication device to the cloud processing system.

4. The communication system having cross-platform communication function of claim 1, further comprising an emergency coordinator electronic device, wherein the cloud processing system is configured to transmit the location information of the communication device to the emergency coordinator electronic device.

5. The communication system having cross-platform communication function of claim 4, wherein the positioning module is a global positioning system module.

6. The communication system having cross-platform communication function of claim 4, wherein the communication device further comprises a manual signal transmitting module configured to be manually operated to transmit the location information of the communication device to the mobile device and the nearby mobile device.

7. The communication system having cross-platform communication function of claim 4, wherein the communication device further comprises an acceleration sensing module configured to measure an acceleration.

8. The communication system having cross-platform communication function of claim 7, wherein the acceleration sensing module is an accelerometer.

9. The communication system having cross-platform communication function of claim 1, wherein the cloud processing system is configured to calculate an estimated location of the communication device according to a location information transmitted by the nearby mobile device.

10. The communication system having cross-platform communication function of claim 1, wherein any one of the communication devices comprises a signal transmitting module, a positioning module and a processing module, wherein the positioning module is configured to obtain the coordinate, and the processing module is connected to the signal transmitting module and the positioning module, and configured to receive the coordinate in order to generate the location information of the communication device.

11. The communication system having cross-platform communication function of claim 1, wherein the location information of the communication device comprises one or more of longitude coordinate, latitude coordinate, altitude coordinate, moving speed, moving trajectory and moving distance.

12. A cross-platform communication method, comprising:

obtaining a coordinate of a current location of a communication device;

generating a location information of the communication device according to the coordinate;

transmitting the location information of the communication device to a mobile device corresponding to the communication device;

transmitting the location information of the communication to a nearby mobile device close to the mobile device so as to transmit the location information of the communication device to a cloud processing system via the mobile device and/or the nearby mobile device; and when any one of the communication devices loses contact, calculating a location of the communication device losing contact according to a moving trajectory, a moving speed, hardware errors and last several pieces of the location information of the communication device losing contact, and a corresponding location information of the communication device adjacent to the communication device losing contact.

13. The cross-platform communication method of claim 12, further comprising:

receiving a location information of another communication device corresponding to another mobile device close to the mobile device, and transmit the location information of another communication device to the cloud processing system.

14. The cross-platform communication method of claim 12, wherein the location information of the communication device comprises one or more of longitude coordinate, latitude coordinate, altitude coordinate, moving speed, moving trajectory and moving distance.

15. The cross-platform communication method of claim 12, further comprising:

transmitting the location information of the communication device to an emergency coordinator electronic device.

16. The cross-platform communication method of claim 12, further comprising:

calculating an estimated location of the communication device according to a location information transmitted by the nearby mobile device.

17. The cross-platform communication method of claim 12, wherein the coordinate is a global positioning system coordinate.

* * * * *